United States Patent
Elderson et al.

(10) Patent No.: US 11,930,002 B2
(45) Date of Patent: Mar. 12, 2024

(54) CROSS-BROWSER SINGLE SIGN-ON

(71) Applicant: LIQUIT SOFTWARE B.V., Dordrecht (NL)

(72) Inventors: Alexander Johannes Elderson, Capelle aan den Ijssel (NL); Kevin Johannes Adrianus Petrus van Gool, Oosterhout (NL)

(73) Assignee: Liquit Software B.V., Dordrecht (NL)

( * ) Notice: Subject to any disclaimer, the term of this patent is extended or adjusted under 35 U.S.C. 154(b) by 305 days.

(21) Appl. No.: 17/335,311

(22) Filed: Jun. 1, 2021

(65) Prior Publication Data
US 2022/0385651 A1 Dec. 1, 2022

(51) Int. Cl.
*H04L 9/40* (2022.01)
*G06F 16/95* (2019.01)

(52) U.S. Cl.
CPC .......... *H04L 63/0815* (2013.01); *G06F 16/95* (2019.01); *H04L 63/083* (2013.01)

(58) Field of Classification Search
CPC .... H04L 63/0815; H04L 63/083; G06F 16/95
See application file for complete search history.

(56) References Cited

U.S. PATENT DOCUMENTS

| | | | |
|---|---|---|---|
| 10,320,771 B2 | 6/2019 | Hande et al. | |
| 10,536,447 B2 | 1/2020 | Rykowski et al. | |
| 10,931,656 B2 | 2/2021 | Carru et al. | |
| 11,063,762 B1 * | 7/2021 | Makarskyy | G06F 9/547 |
| 2014/0325621 A1 | 10/2014 | Sanin et al. | |
| 2018/0302390 A1 * | 10/2018 | Beecham | H04L 63/0281 |
| 2019/0058707 A1 * | 2/2019 | Chung | H04L 63/0807 |
| 2019/0334887 A1 | 10/2019 | Sridharan et al. | |
| 2019/0364033 A1 * | 11/2019 | Wisgo | G06F 21/41 |
| 2020/0099677 A1 | 3/2020 | Grajek et al. | |
| 2022/0217132 A1 * | 7/2022 | Ahmed | H04L 63/0807 |

OTHER PUBLICATIONS

Shubho, A., "Single Sign On (SSO) for Cross-Domain ASP.NET Applications: Part-I—The Design Blue Print", Oct. 1, 2010, 11 pages, retrieved from https://www.codeproject.com/Articles/106439/Single-Sign-On-SSO-for-cross-domain-ASP-NET-applic.

* cited by examiner

*Primary Examiner* — Thaddeus J Plecha
(74) *Attorney, Agent, or Firm* — Steven M. Koehler; Westman, Champlin & Koehler, P.A.

(57) ABSTRACT

A system for providing single sign-on comprises an authentication server, multiple application servers and multiple computing devices. An application server directs a web browser running on a computing device to the authentication server. If the authentication server cannot authenticate the user based on the request it receives, it causes the browser to contact a web server of a local device agent also running on the computing device. The device agent determines whether a token for authenticating the user is available and if so, transmits a response which includes the token. If the authentication server can authenticate the user based on the token, it transmits a response which includes authentication information associated with the token and which causes the browser to direct to the application server. This reduces the number of times the user must authenticate himself without compromising security or requiring adapted web browsers.

24 Claims, 7 Drawing Sheets

CROSS-BROWSER SINGLE SIGN-ON

FIELD OF THE INVENTION

The invention relates to a computing device, an authentication server, and a system comprising the computing device and the authentication server.

The invention further relates to a computer-implemented method of enabling authentication of a user and a computer-implemented method of authenticating a user.

The invention also relates to computer program products enabling computer systems to perform such methods.

BACKGROUND OF THE INVENTION

In corporate environments, single sign-on (SSO) has become the default for any web-based application. Even for corporate users that are working outside of corporate environments, single sign-on has become the standard. There are many ways of accomplishing single sign-on. Federation plays a big role in providing SSO, e.g., in OAuth and SAML, but before federation can work, a user should be known to the authentication service, e.g., to the SAML Identity Provider (IDP) or OAuth authorization server. This imposes a challenge to the corporations and organizations who want to offer SSO to their users.

A particular challenge is that some web-based applications require a specific web browser or web browser version. Sharing a user session with respect to an authentication server between web browsers cannot be done in a reliable way. As a result, a user will need to authenticate himself in each web browser and typically needs to repeat this each time he logs into his computing device.

SUMMARY OF THE INVENTION

In a first aspect of the invention, a computing device comprises at least one processor which is configured to transmit a first request from a web browser running on the computing device to an application server, receive, at the web browser, from the application server, a first response which directs the web browser to an authentication server, transmit a second request from the web browser to the authentication server upon receiving the first response, receive, at the web browser, from the authentication server, a second response which causes the web browser to contact a local device agent also running on the computing device, the local device agent comprising a local web server, provide a third request from the web browser to the local web server upon receiving the second response, and determine, at the local device agent, based on an identifier of a user and/or an identifier of a user session associated with the third request, whether a token for authenticating the user is available, The at least one processor is further configured to provide a third response from the local web server to the web browser if the token is available, the third response comprising the token, transmit a fourth request from the web browser to the authentication server upon obtaining the third response, the fourth request comprising the token, receive, at the web browser, a fourth response from the authentication server, the fourth response comprising authentication information associated with the token and causing the web browser to direct to the application server, and transmit a fifth request from the web browser to the application server upon receiving the fourth response, the fifth request comprising the authentication information.

When a new browser or new private session in the same browser is used for visiting a federated web application, the web application will send the user to the authentication server and the authentication server may then obtain a token for authenticating the user, for the purpose of single sign-on, from the local web server via the web browser. By using a local web server running on the same computing device that is also running the web browser(s) and which can be trusted by the computing device, the user does not have the authenticate himself at the authentication server as often, without compromising security and without requiring adapted web browsers.

The local web server does not need to receive messages directly from the authentication server, as all messages for the local web server are first received by the web browser, and the local web server is preferably configured not to receive and/or process any messages directly from the authentication server. For example, the local web server may be configured not to receive and/or process any messages from outside the computing device. This ensures a high level of security.

The token may be a JSON web token, for example. The computing device may be a user device or may be a workspace server which runs the web browser and the local device agent in a workspace associated with the user. Preferably, all communication takes place over a secure channel (e.g., by using https). The authentication server may be a SAML IDP server or an OAuth authorization server, for example. The authentication server may use an LDAP server, e.g., an Active Directory server, for user credential validation, for example.

The solution described above has advantages over alternative solutions. As a first alternative solution, one could let a web browser start up another web browser from a system with a specified URL which include a session identifier for an authentication server. However, this session identifier would then be exposed in the URL query component, which poses a security risk. As a second alternative solution, one could use browser addons to provide single sign-on. A downside of this approach is that for every browser, an addon must be made and installed on the user's device.

The at least one processor may be configured to obtain a process identifier from an operating system of the computing device based on an identifier associated with the third request and obtain the identifier of the user session and/or the identifier of the user from the operating system based on the process identifier. Since the third request does not need to comprise a user identifier or user session identifier in this case, no changes to the web browser are necessary to insert this information. The process identifier can normally only be obtained from the operating system (e.g., Windows or Linux) when the request originates from the same computing device. Thus makes the use of a local web server especially beneficial.

The at least one processor may be configured to determine, at the local device agent, an identifier associated with the authentication server based on the third request and determine, at the local web server, based on the identifier of the user and/or the identifier of the user session and based on the identifier associated with the authentication server, whether a token for authenticating the user at the authentication server is available. The identifier associated with the authentication server may identify an authentication service. This makes it possible to use the same local web server for multiple authentication services.

The token may be associated with the identifier of the user session and the at least one processor may be configured to delete the token when the user logs out of the computing device. This ensures a high level of security.

Alternatively, the token may be associated with the identifier of the user and the at least one processor may be configured to share the token such that the token can be used on a further computing device when the user is logged in to the further computing device. The at least one processor may be configured to determine whether another user session associated with the user exists when the user logs out of the computing device and delete the token if another user session associated with the user is determined not to exist.

The at least one processor may be configured to provide the token from the local web server to a further web browser also running on the computing device. The above-mentioned solution may thus not only be beneficial when a new private session in the same browser is used for visiting a federated web application but also when a new browser is used for visiting a federated web application.

In a second aspect of the invention, an authentication server comprising at least one processor which is configured to receive a second request from a web browser running on a computing device, the second request being received because the web browser has been directed to the authentication server by an application server, determine whether a user can be authenticated based on the second request, transmit a second response to the web browser if the user could not be authenticated based on the request, the second response causing the web browser to contact a local device agent also running on the computing device, the local device agent comprising a local web server, receive a fourth request from the web browser, the fourth request comprising a token for authenticating the user which was obtained by the web browser from the local web server, determine whether the user can be authenticated based on the token, and transmit a fourth response to the web browser to direct the web browser to the application server if the user could be authenticated based on the token, the fourth response comprising authentication information associated with the token.

The second response may comprise an IP address having a value of 127.0.0.1 to cause the web browser to contact the local device agent at the IP address. The second response may also comprise a port for the web browser to use to contact (the web server of) the local device agent on the computing device. The port is preferably non-standard (e.g., a port other than 80 or 443) to avoid a conflict between the local device agent and other software running on the computing device. The at least one processor may be configured to determine whether the user can be authenticated based on the second request by comparing a session identifier included in the second request with a plurality of stored session identifiers. The session identifier may be included in the second request as a cookie, for example.

The at least one processor may be configured to receive an alternative fourth request from the web browser, the alternative fourth request not comprising a token for authenticating the user, request and receive user input for authenticating the user upon receiving the alternative fourth request, determine whether the user can be authenticated based on the user input, create or retrieve the token based on the user input if the user could be authenticated based on the user input, and transmit an alternative fourth response to the web browser to direct the web browser to the local web server if the user could be authenticated based on the user input, the alternative fourth response comprising the authentication information and the token.

In a third aspect of the invention, a computer-implemented method of enabling authentication of a user comprises transmitting a first request from a web browser running on a computing device to an application server, receiving, at the web browser, from the application server, a first response which directs the web browser to an authentication server, transmitting a second request from the web browser to the authentication server upon receiving the first response, receiving, at the web browser, from the authentication server, a second response which causes the web browser to contact a local device agent also running on the computing device, the local device agent comprising a local web server, providing a third request from the web browser to the local web server upon receiving the second response, and determining, at the local device agent, based on an identifier of the user and/or an identifier of a user session associated with the third request, whether a token for authenticating the user is available.

The method further comprises providing a third response from the local web server to the web browser if the token is available, the third response comprising the token, transmitting a fourth request from the web browser to the authentication server upon obtaining the third response, the fourth request comprising the token, receiving, at the web browser, a fourth response from the authentication server, the fourth response comprising authentication information associated with the token and causing the web browser to direct to the application server, and transmitting a fifth request from the web browser to the application server upon receiving the fourth response, the fifth request comprising the authentication information. The method may be performed by software running on a programmable device. This software may be provided as a computer program product.

The method may further comprise obtaining a process identifier from an operating system of the computing device based on an identifier associated with the third request and obtaining the identifier of the user session and/or the identifier of the user from the operating system based on the process identifier.

The method may comprise determining an identifier associated with the authentication server based on the third request and determining, based on the identifier of the user and/or the identifier of the user session and based on the identifier associated with the authentication server, whether the token for authenticating the user at the authentication server is available.

The token may be associated with the identifier of the user session and the method may further comprise deleting the token when the user logs out of the computing device. Alternatively, the token may be associated with the identifier of the user and the method may further comprise sharing the token such that the token can be used on a further computing device when the user is logged in to the further computing device.

The method may further comprise determining whether another user session associated with the user exists when the user logs out of the computing device and deleting the token if another user session associated with the user is determined not to exist.

The method may further comprise providing the token from the local web server to a further web browser also running on the computing device.

In a fourth aspect of the invention, a computer-implemented method of authenticating a user comprises receiving, at an authentication server, a second request from a web browser running on a computing device, the second request being received because the web browser has been directed to the authentication server by an application server, determining whether the user can be authenticated based on the second request, transmitting a second response to the web browser if the user could not be authenticated based on the request, the second response causing the web browser to contact a local device agent also running on the computing device, the local device agent comprising a local web server, receiving a fourth request from the web browser, the fourth request comprising a token for authenticating the user which was obtained by the web browser from the local web server, determining whether the user can be authenticated based on the token, and transmitting a fourth response to the web browser to direct the web browser to the application server if the user could be authenticated based on the token, the fourth response comprising authentication information associated with the token. The method may be performed by software running on a programmable device. This software may be provided as a computer program product.

The second response may comprise an IP address having a value of 127.0.0.1 to cause the web browser to contact the local device agent at the IP address. Determining whether the user can be authenticated based on the second request may comprise comparing a session identifier included in the second request with a plurality of stored session identifiers.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations for enabling authentication of a user.

These executable operations comprise transmitting a first request from a web browser running on a computing device to an application server, receiving, at the web browser, from the application server, a first response which directs the web browser to an authentication server, transmitting a second request from the web browser to the authentication server upon receiving the first response, receiving, at the web browser, from the authentication server, a second response which cause the web browser to contact a local device agent also running on the computing device, the local device agent comprising a local web server, providing a third request from the web browser to the local web server upon receiving the second response, and determining, at the local device agent, based on an identifier of the user and/or an identifier of a user session associated with the third request, whether a token for authenticating the user is available.

These executable operations further comprise providing a third response from the local web server to the web browser if the token is available, the third response comprising the token, transmitting a fourth request from the web browser to the authentication server upon obtaining the third response, the fourth request comprising the token, receiving, at the web browser, a fourth response from the authentication server, the fourth response comprising authentication information associated with the token and causing the web browser to direct to the application server, and transmitting a fifth request from the web browser to the application server upon receiving the fourth response, the fifth request comprising the authentication information.

A non-transitory computer-readable storage medium stores at least a second software code portion, the second software code portion, when executed or processed by a computer, being configured to perform executable operations for authenticating a user.

These executable operations comprise receiving, at an authentication server, a second request from a web browser running on a computing device, the second request being received because the web browser has been directed to the authentication server by an application server, determining whether the user can be authenticated based on the second request, transmitting a second response to the web browser if the user could not be authenticated based on the request, the second response causing the web browser to contact a local device agent also running on the computing device, the local device agent comprising a local web server, receiving a fourth request from the web browser, the fourth request comprising a token for authenticating the user which was obtained by the web browser from the local web server, determining whether the user can be authenticated based on the token, and transmitting a fourth response to the web browser to direct the web browser to the application server if the user could be authenticated based on the token, the fourth response comprising authentication information associated with the token.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
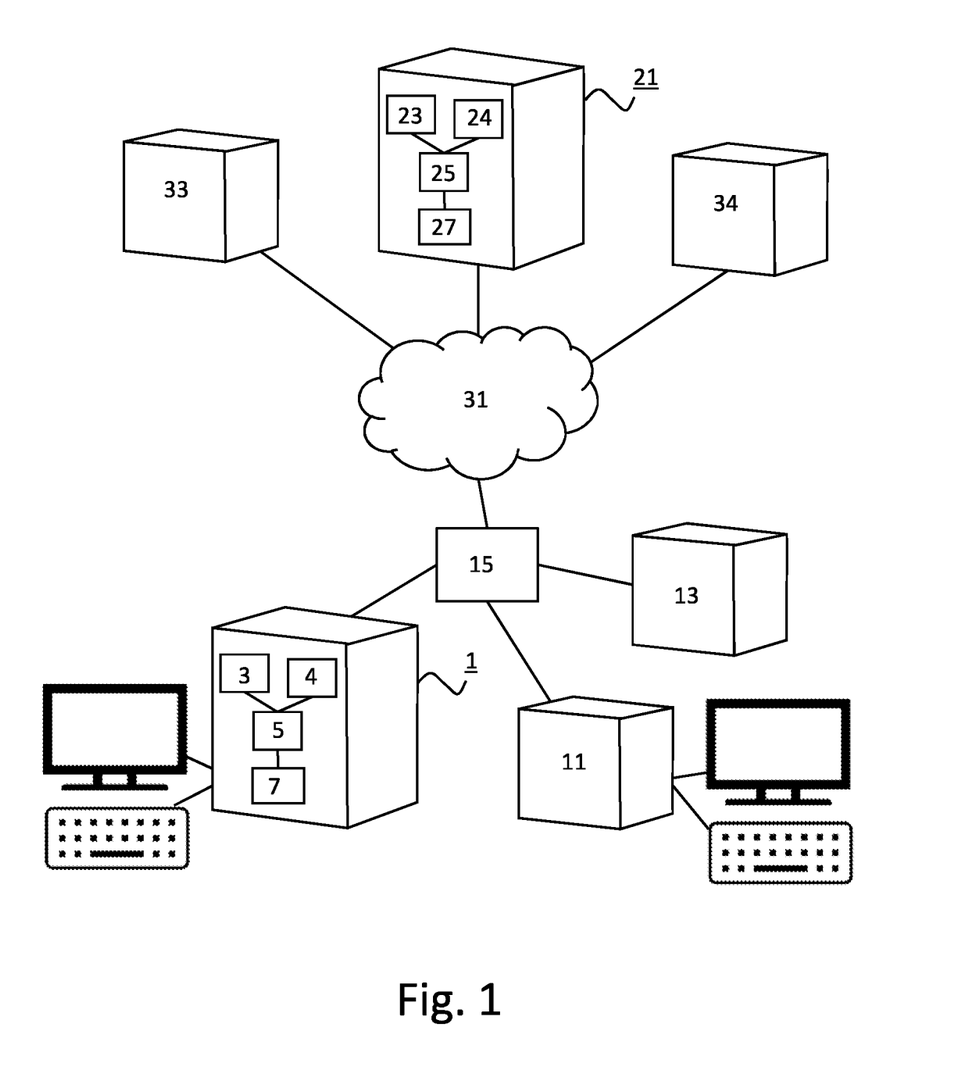
FIG. 1 is a block diagram of embodiments of the computing device and authentication server.

FIG. 1 shows a system for providing single sign-on which comprises an authentication server 21, two application servers 33 and 34 and two computing devices 1 and 11. The two computing devices 1 and 11 are connected to an Internet access point 15. The Internet access point 15 is connected to the Internet 31. The application servers 33-34 and the authentication server 21 are also connected to the Internet 31.

The computing device 1 comprises a receiver 3, a transmitter 4, a processor 5, and storage means 7. A web browser and a local device agent have been installed on the computing device 1. The web browser is typically a standard web browser without any specific modifications. The local device agent comprises a web server and business logic. This web server is configured not to receive and/or process any messages directly from any external device.

As a result of the installation of the web browser and the local device agent, the processor 5 is configured to transmit, via transmitter 4, a first request from a web browser running on the computing device to an application server, receive, at the web browser, via the receiver 3, from the application server, a first response which directs the web browser to an authentication server, transmit, via the transmitter 4, a second request from the web browser to the authentication server upon receiving the first response, and receive, at the web browser, via the receiver 3, from the authentication server 21, a second response which causes the web browser to contact the local device agent also running on the computing device.

As a result of the installation of the web browser and the local device agent, the processor 5 is further configured to provide a third request from the web browser to the local web server upon receiving the second response, determine, at the local device agent, based on an identifier of a user and/or an identifier of a user session associated with the third request, whether a token for authenticating the user is available, and provide a third response from the local web server to the web browser if the token is available, the third response comprising the token.

As a result of the installation of the web browser and the local device agent, the processor 5 is further configured to transmit, via the transmitter 4, a fourth request from the web browser to the authentication server 21 upon obtaining the third response, the fourth request comprising the token, receive, at the web browser, via the receiver 3, a fourth response from the authentication server 21, the fourth response comprising authentication information associated with the token and causing the web browser to direct to the application server, and transmit, via the transmitter 4, a fifth request from the web browser to the application server upon receiving the fourth response, the fifth request comprising the authentication information.

The device agent is responsible for maintaining a collection of tokens for a user that is logged in on the computing device 1. Typically, a different token is stored for each different authentication service and for each different user session or user. Normally, the same token is used for different browsers. The device agent runs a web server which can only be accessed on the localhost (not accessible from the network). The tokens may be stored in storage means 7. The storage should be arranged in such way, that logged on users are not able to access the tokens. The tokens may be JSON Web Tokens, for example. The tokens typically indicate for which user they are valid and how long they are valid and identify the authentication service.

In a first implementation, there always needs to be a match between the user session identifier associated with the request and the user session identifier associated with the token. In this first implementation, if a user has different local user sessions, the tokens are not shared between the different local user sessions. In this first implementation, the stored tokens are user session based (forgotten after the user logs out of the device).

In a second implementation, tokens may be shared between different user sessions of the same user. For example, if a user starts using a first PC and then moves (e.g., temporarily) to a second PC, it may be possible to use the same tokens in the different user sessions. The token may be shared via a local server 13, e.g., an Active Directory server. The local server 13 is also connected with the Internet access point 15. The device agent is preferably configured to accept only requests (received via the web browser) which originate from known and trusted authentication services. In this second implementation, the tokens may be forgotten when the last user session has ended, and new tokens will then be created after the user has started a new session.

The authentication server 21 comprises a receiver 23, a transmitter 24, a processor 25, and storage means 27. The processor 25 is configured to receive, via the receiver 23, a second request from a web browser running on a computing device, the second request being received because the web browser has been directed to the authentication server by an application server, determine whether a user can be authenticated based on the second request, and transmit, via the transmitter 24, a second response to the web browser if the user could not be authenticated based on the request, the second response causing the web browser to contact the local device agent also running on the computing device.

The processor 25 is further configured to receive, via the receiver 23, a fourth request from the web browser, the fourth request comprising a token for authenticating the user which was obtained by the web browser from the local web server, determine whether the user can be authenticated based on the token, and transmit, via the transmitter 24, a fourth response to the web browser to direct the web browser to the application server if the user could be authenticated based on the token, the fourth response comprising authentication information associated with the token. The installation of special software on the authentication server 21 may cause the processor 25 to be configured in the way described above.

Determining whether the user can be authenticated based on the token comprises validating the token and may comprise determining whether the token identifies the user, has not expired yet, and has been signed by the authentication service. In the description of FIG. 1, the term authentication server refers to a single device. However, the term authentication server may also refer to multiple devices.

In the embodiment of the computing device 1 shown in FIG. 1, the computing device 1 comprises one processor 5. In an alternative embodiment, the computing device 1 comprises multiple processors. The processor 5 of the computing device 1 may be a general-purpose processor, e.g., from Intel or AMD, or an application-specific processor. The processor 5 of the computing device 1 may run a Windows, iOS, or Unix-based operating system for example. The storage means 7 may comprise one or more memory units. The storage means 7 may comprise one or more hard disks and/or solid-state memory, for example. The storage means 7 may be used to store an operating system, applications and application data, for example.

The receiver 3 and the transmitter 4 may use one or more wired and/or wireless communication technologies such as Ethernet and/or Wi-Fi (IEEE 802.11) to connect to the Internet 31, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The computing device 1 may comprise other components typical for a computing device such as a power connector. The invention may be implemented using a computer program running on one or more processors.

The computing device 1 may be, for example, a user device like a desktop PC or laptop PC. Alternatively, the computing device 1 may be a workspace server which is running the web browser and the local device agent in a workspace associated with the user, for example. The computing device 11 may be configured in the same way as computing device 1. The computing device 11 may also be a user device or a workspace server, for example.

In the embodiment of the authentication server 21 shown in FIG. 1, the authentication server 21 comprises one processor 25. In an alternative embodiment, the authentication server 21 comprises multiple processors. The processor 25 of the authentication server 21 may be a general-purpose processor, e.g., from Intel or AMD, or an application-specific processor. The processor 25 of the authentication server 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to connect to the Internet 21, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 23 and the transmitter 24 are combined into a transceiver. The authentication server 21 may comprise other components typical for a server such as a power connector. The invention may be implemented using a computer program running on one or more processors.

Figure 2:
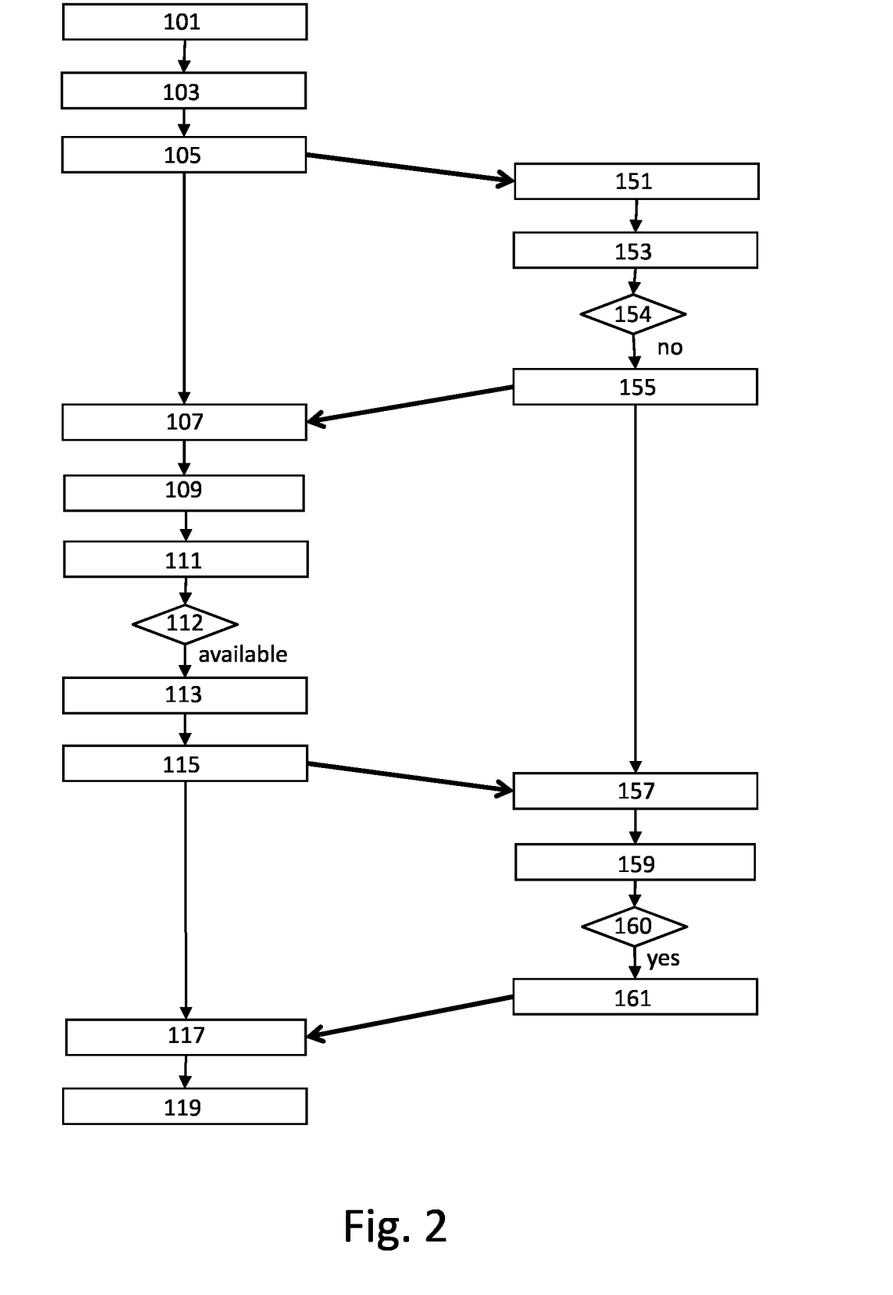
FIG. 2 is a flow diagram of first embodiments of the methods.

First embodiments of the computer-implemented methods of authenticating a user are shown in FIG. 2. A step 101 comprises transmitting a first request from a web browser running on a computing device to an application server, typically as a result of a user selecting a web application, e.g., by entering an URL of the web application. A step 103 comprises receiving, at the web browser, from the application server, a first response which directs the web browser to an authentication server. The web browser may be (re-)directed to a server by redirecting an HTTP request or by using the window.location.replace method or the window.location.href method in JavaScript, for example. This first response is transmitted by the application server when it does not recognize the session, e.g., when the relevant cookie for the web application is missing. The first response comprises an URL associated with an authentication service. A single web application typically uses a single authorization service. A step 105 comprises the web browser transmitting a second request upon receiving the first response. The second request is transmitted to the authentication server of the authentication service.

A step 151 comprises receiving the second request from the web browser at the authentication server. A step 153 comprises determining, at the authentication server, whether the user can be authenticated based on the second request. Step 153 may comprise comparing a session identifier included in the second request with a plurality of stored session identifiers to check whether the request belongs to an existing session. The session identifier may be transmitted as a cookie, for example.

A step 154 comprises checking whether the user could be authenticated in step 153. If not, a step 155 is performed. Step 155 comprises transmitting a second response from the authentication server to the web browser if the user could not be authenticated based on the request. The second response causes the web browser to contact a local device agent also running on the computing device. The local device agent comprises a local web server. The second response may comprise an IP address having a value of 127.0.0.1 to cause the web browser to contact the local device agent at this IP address, for example. The second response may also comprise a port for the web browser to use to contact (the web server of) the local device agent on the computing device, e.g., a port other than port 80 or 443.

A step 107 comprises receiving the second response from the authentication server at the web browser. A step 109 comprises providing a third request from the web browser to the local web server upon receiving the second response. For example, the second response may comprise a web page which comprises (e.g., JavaScript) code and this code may cause the web browser to provide the third request to the local web server. In this case, the webpage with the code forms the hub for communication between the authentication server and the local device agent. A step 111 comprises determining, at the local device agent, based on an identifier of the user and/or an identifier of a user session associated with the third request, whether a token for authenticating the user is available. The token may be a JSON Web Token (JWT), for example. The token should preferably be protected against all known forms of interception/manipulation/reuse.

The token may be associated with the identifier of the user of with the identifier of the user session, for example. If the token is associated with the identifier of the user session, the method may further comprise deleting the token when the user logs out of the computing device (not shown). If the token is associated with the identifier of the user, the method may further comprise sharing the token such that the token can be used on a further computing device when the user is logged in to the further computing device (not shown).

A step 112 comprises checking whether the token was determined to be available in step 111. If so, a step 113 is performed. Step 113 comprises providing a third response from the local web server to the web browser. The third response comprises the token. Step 115 comprises transmitting a fourth request from the web browser to the authentication server upon obtaining the third response. The fourth request comprises the token. For example, the above-mentioned code may receive the token from the local web server and cause the web browser to transmit the fourth request to the authentication server.

A step 157 comprises receiving the fourth request from the web browser at the authentication server. A step 159 comprises determining, at the authentication server, whether the user can be authenticated based on the token received in step 157. A step 160 comprises checking whether the user could be authenticated in step 159. If so, a step 161 is performed. Step 161 comprises transmitting a fourth response from the authentication server to the web browser to cause the web browser to direct to the application server. The fourth response comprises authentication information associated with the token.

A step 117 comprises the web browser receiving the fourth response from the authentication server. A step 119 comprises transmitting a fifth request from the web browser to the application server upon receiving the fourth response. The fifth request comprises the authentication information. After receipt of the authentication information, the web application returns application content to the web browser (not shown in FIG. 2). The above steps may be performed with multiple web applications and multiple application servers and thereby allow the user to use a single sign-on for multiple web applications. The requests described above may comprise HTTP GET and/or HTTP POST requests, for example.

Figure 3:
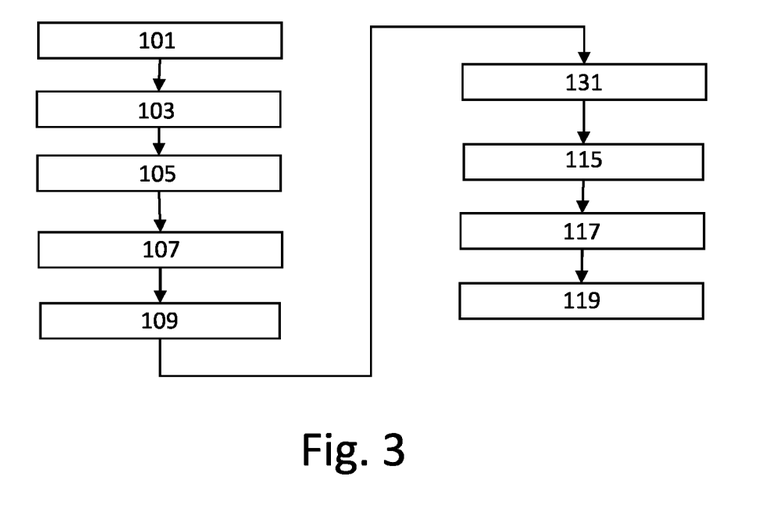
FIG. 3 is a flow diagram showing the steps performed by the web browser in a second embodiment.

FIG. 3 is a flow diagram showing the steps performed by the web browser running on a computing device in a second embodiment of the method of enabling authentication of a user. Step 101 comprises the web browser transmitting a first request. The first request is transmitted to an application server. Step 103 comprises receiving, at the web browser, from the application server, a first response which directs the web browser to an authentication server. Step 105 comprises the web browser transmitting a second request upon receiving the first response. The second request is transmitted to the authentication server.

Step 107 comprises receiving, at the web browser, from the authentication server, a second response which causes the web browser to a contact local device agent also running on the computing device. The local device agent comprises a local web server. Step 109 comprises providing a third request from the web browser to the local web server upon receiving the second response. A step 131 comprises the web browser obtaining a third response from the local web server if a token for authenticating the user is available at the local web server. The third response comprises the token.

Step 115 comprises transmitting a fourth request from the web browser to the authentication server upon obtaining the third response. The fourth request comprises the token obtained in step 113. Step 117 comprises receiving a fourth response at the web browser. The fourth response is received from the authentication server. The fourth response comprises authentication information associated with the token and causes the web browser to direct to the application server. Step 119 comprises transmitting a fifth request from the web browser to the application server upon receiving the fourth response. The fifth request comprises the authentication information received from the authentication server in step 117.

Figure 4:
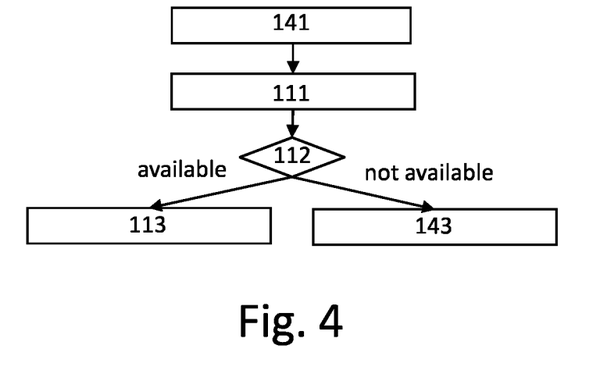
FIG. 4 is a flow diagram showing the steps performed by the local device agent in the second embodiment.

FIG. 4 is a flow diagram showing the steps performed by a device agent running on a computing device in a second embodiment of the method of enabling authentication of a user. The device agent comprises a web server. A step 141 comprises obtaining a request from a web browser at the web server of the device agent. The web browser is running on the same computing device as the device agent. Step 111 comprises determining, at the local device agent, based on an identifier of the user and/or an identifier of a user session associated with the request obtained in step 141, whether a token for authenticating the user is available. The token may be a JSON Web Token (JWT), for example.

Step 111 may comprise obtaining a process identifier from an operating system of the computing device based on an identifier associated with the request and obtaining the identifier of the user session and/or the identifier of the user from the operating system based on the process identifier. Since the request does not need to comprise a user identifier or user session identifier in this case, no changes to the web browser are necessary to insert this information.

The token may be associated with the identifier of the user of with the identifier of the user session, for example. If the token is associated with the identifier of the user, it may be shared with other devices such that the token can be used on a further computing device when the user is logged in to the further computing device. Tokens may be shared via an Active Directory Server, for example. If the token is associated with the identifier of the user session, the token is preferably deleted when the user logs out of the computing device, i.e., ends the user session. If the token is associated with the identifier of the user, the token may be deleted when no user session is left.

The multiple web applications used by the user may all use the same authentication service, but it is also possible that one or more web applications use a different authentication service than other web applications. In this case, step 111 may comprise determining, at the local device agent, an identifier associated with the authentication server based on the request and determine, at the local device agent, based on the identifier of the user and/or the identifier of the user session and based on the identifier associated with the authentication server, whether a token for authenticating the user at the authentication server is available. The identifier associated with the authentication server typically identifies the authentication service (e.g., Facebook).

Step 112 comprises checking whether the token was determined to be available in step 111. If so, step 113 is performed. If not, a step 143 is performed. Step 113 comprises the local web server providing a response to the web browser. This response comprises the token. Step 143 comprises transmitting an alternative response. This alternative response does not comprise the token but causes the web browser to inform the authentication server that no relevant token is available on the local device agent.

Figure 5:
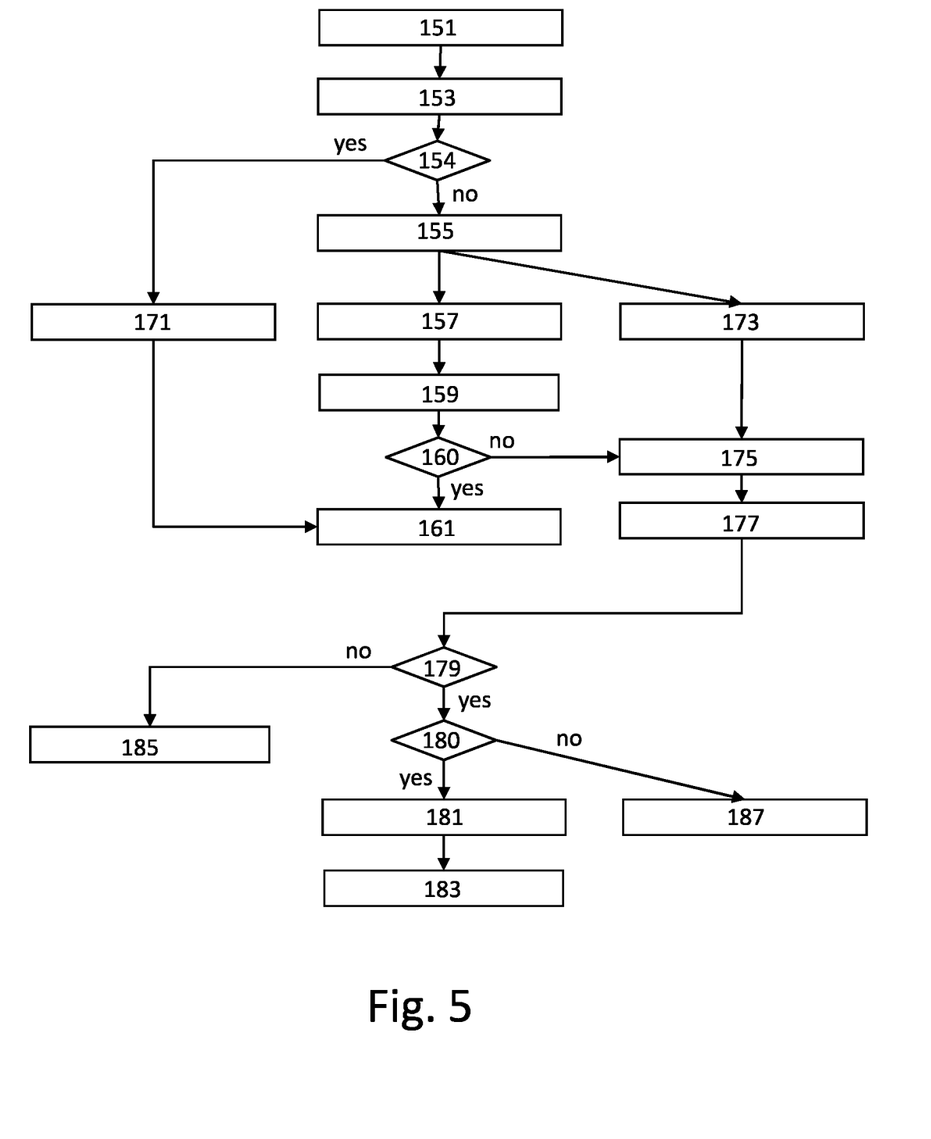
FIG. 5 is a flow diagram showing the steps performed by the authentication server in the second embodiment.

FIG. 5 is a flow diagram showing the steps performed by the authentication server in a second embodiment of the method of authenticating a user. Step 151 comprises the authentication server receiving a request from a web browser running on a computing device. The request is received because the web browser has been directed to the authentication server by an application server. Step 153 comprises determining, at the authentication server, whether the user can be authenticated based on the second request.

Step 153 may comprise comparing a session identifier included in the second request with a plurality of stored session identifiers to check whether the request belongs to an existing session. The session identifier may be transmitted as a cookie, for example. A step 154 comprises checking whether the user could be authenticated in step 153. If so, a step 171 is performed. If not, step 155 is performed. Step 171 comprises obtaining authentication information associated with the session identifier (and associated with a previously provided token). Step 161 is performed after step 171.

Step 155 comprises the authentication server transmitting a response to the web browser. The response causes the web browser to contact a local device agent also running on the computing device. The local device agent comprises a local web server. Next, a further request is received in step 157 if a relevant token for authenticating the user was available on the local device agent or an alternative further request is received in a step 173 if no relevant token for authenticating the user was available on the local device agent or if no device agent was present on the computing device.

Step 157 comprises receiving the further request from the web browser at the authentication server. The further request comprises the token, which was obtained by the web browser from the local device agent. Next, step 159 comprises determining, at the authentication server, whether the user can be authenticated based on the token received in step 157. Step 160 comprises checking whether the user could be authenticated in step 159. If not, a step 175 is performed. If so, step 161 is performed. Step 161 comprises the authentication server transmitting a further response to the web browser to direct the web browser to the application server. The further response comprises authentication information associated with the token received in step 157 or obtained in step 171.

Step 173 comprises the authentication server receiving the alternative further request from the web browser. The alternative further request does not comprise a token for authenticating the user. In the embodiment of FIG. 5, the alternative further request further indicates whether a local device agent was found or not. Next, step 175 comprises the authentication server requesting and receiving user input for authenticating the user. A step 177 comprises the authentication server determining whether the user can be authenticated based on the received user input. A step 179 comprises checking whether the user could be authenticated in step 177. If so, a step 180 is performed. If not, a step 185 is performed. Step 185 comprises the authentication server transmitting an error response to the web browser, which informs the user that he could not be authenticated.

Step 180 comprise determining whether a local device agent is present. If an invalid token was received in step 157, a local device agent is apparently present. Furthermore, the alternative further request received in step 173 indicates whether a local device agent was found or not. A step 181 is performed if it is determined in step 180 that a local device agent is present.

Step 181 comprises the authentication server creating or retrieving a token based on the user input received in step 175. Next, a step 183 comprises the authentication server transmitting an alternative further response to the web browser. The alternative further response causes the web browser to contact the local device agent and comprises both the token and authentication information associated with the token. This causes the web browser to transmit the token to the local device agent, which stores this token, before the web browser is directed to the application server and thereby transmits the authentication information to the application server.

If it is determined in step 180 that no local device agent is present, a step 187 is performed. Step 187 comprises the authentication server transmitting a response to the web browser which comprises the authentication information but no token. This response causes the web browser to direct to the application server directly, like the further response transmitted in step 161, but the transmitted authentication information has not been determined based on a token or obtained based on a session identifier, unlike the authentication information comprised in the further response transmitted in step 161.

Figure 6:
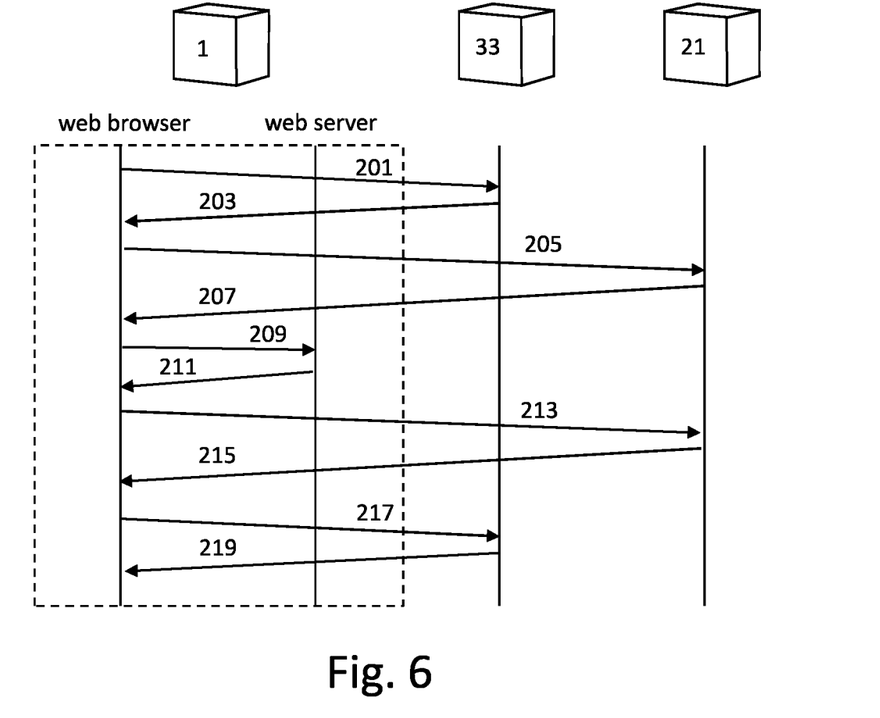
FIG. 6 shows an example of a flow in which a user, who has been authenticated in the same user session while utilizing another browser, is now utilizing a new web browser.

FIG. 6 shows an example of a flow in which a user, who has been authenticated in the same user session while utilizing another browser, is now utilizing a new web browser (or a different private tab in the same browser). With a request 201, a user uses a web browser on a computing device 1 to navigate to a web application on an application server 33. In the example of FIG. 6, the web application does not recognize the session (e.g., the relevant cookie for to web application is missing) and directs it to an authentication server 21, e.g., of an IDP, with a response 203. After the authentication server has received the request 205, it checks for an existing session.

In the example of FIG. 6, an existing session does not exist, and the authentication server, with a response 207, causes the web browser to contact a local device agent to retrieve a token from the local device agent. The response 207 may cause the web browser to transmit a request to a port on the localhost (IP address 127.0.0.1). The port is preferably standardized for device agents, but non-standard (e.g., a port other than 80 or 443) for applications in general, to avoid a conflict between the local device agent and other software running on the computing device. The web page that causes the web browser to contact the local device agent preferably has a timeout of no more then 2 seconds, as the local connection between the web browser and the local web server of the device agent should be able to be setup up near instantly.

After the local web server has received the request 209, the local device agent checks whether a relevant token (e.g., a JWT token) is available. In the example of FIG. 6, an existing token is found by the local device agent and included in its response 211 to the web browser. The web browser then transmits a request 213 to the authentication server. The request 213 comprises the token. The authentication server then validates the token (e.g., validates the signature in a JWT token). In the example of FIG. 6, this validation is successful, and the authentication server transmits a response 215 to cause the web browser to direct to the requesting web application. The response 215 comprises authentication information. This causes the web browser to transmit a request 217 to the application server, which recognizes the authentication information in the request 217 and returns application content to the web browser, starting with a response 219.

Figure 7:
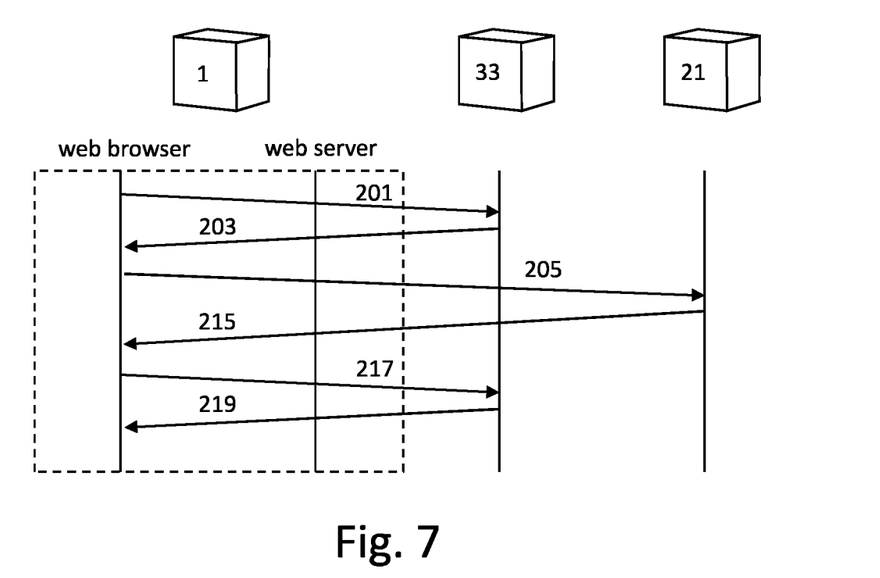
FIG. 7 shows an example of a flow in which a user, who has been authenticated in the same user session while utilizing the same browser, is now using a new web application.

FIG. 7 shows an example of a flow in which a user, who has been authenticated in the same user session while utilizing the same browser, is now using a new web application. With request 201, a user uses a web browser on a computing device 1 to navigate to a web application on an application server 33. In the example of FIG. 6, the web application does not recognize the session and directs it to an authentication server 21, with response 203. After the authentication server has received the request 205, it checks for an existing session. In the example of FIG. 6, the authentication server finds an existing session, obtains authentication information associated with the existing session, and transmits response 215 to the web browser to cause the web browser to direct to the requesting web application. The response 215 comprises the authentication information. This causes the web browser to transmit request 217 to the application server, which recognizes the authentication information in the request 217 and returns application content to the web browser, starting with response 219.

Figure 8:
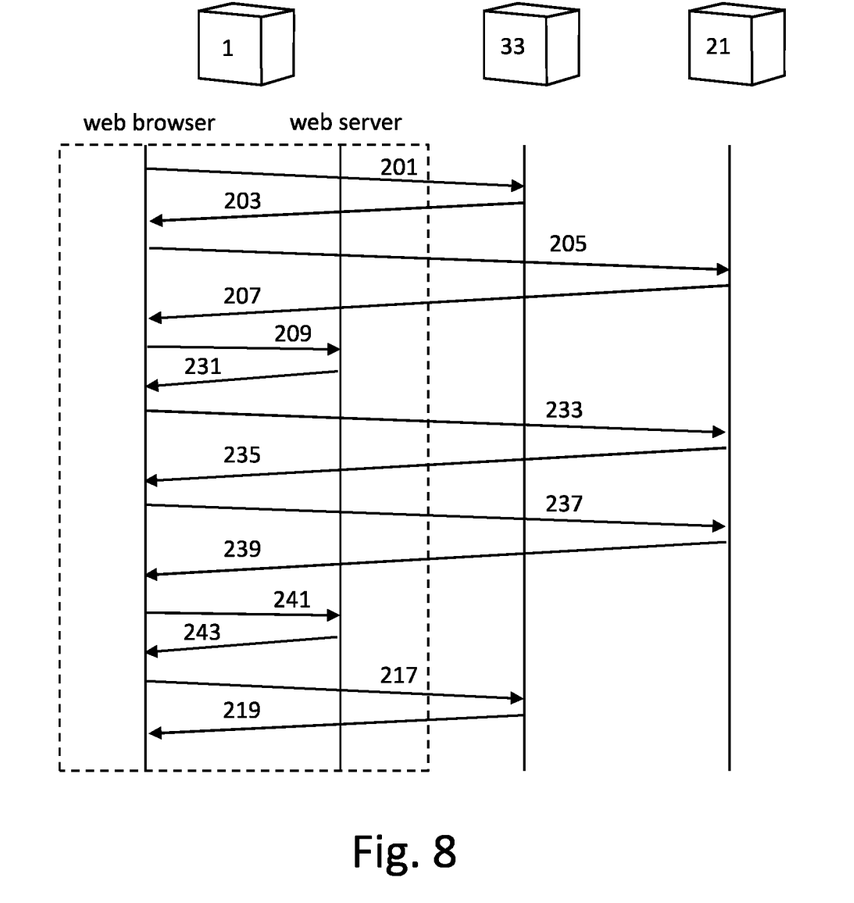
FIG. 8 shows an example of a flow in which a user is using a web application after just starting a new user session.

FIG. 8 shows an example of a flow in which a user is using a web application after just starting a new user session. With request 201, a user uses a web browser on a computing device 1 to navigate to a web application on an application server 33. In the example of FIG. 8, the web application does not recognize the session and directs it to an authentication server 21 with response 203. After the authentication server has received the request 205, it checks for an existing session. In the example of FIG. 8, an existing session does not exist, and the authentication server, with response 207, causes the web browser to contact a local device agent, with request 209, to retrieve a token from the local device agent.

After the local web server has received the request 209, the local device agent checks whether a relevant token (e.g., a JWT token) is available. In the example of FIG. 8, no stored token is found by the local device agent. The local web server then provides a response 231 to the web browser. This causes the web browser to transmit a request 233 to the authentication server. The user then authenticates by any means to the authentication server. In the example of FIG. 8, a response 235 causes the web browser to ask the user to enter a username and password, and after the user has entered this information in his web browser, the web browser transmits this information to the authentication server in a request 237. Optionally, the user is asked to enter a one-time password code or confirm that he wants to be authenticated by using his mobile device. This is not shown in FIG. 8.

In the example of FIG. 8, the user can be authenticated based on the entered information, and the authentication server creates or retrieves a token, which it transmits to the web browser in a response 239 along with authentication information. In the example of FIG. 8, a device agent has been determined to be present on the computing device 1.

The response 239 causes the web browser to contact the local web server, with a request 241, to allow the local device agent to store the token for future use.

Receipt of response 243 causes the web browser to transmit request 217 to the application server. The request 243 comprises the authentication information received in response 239. The application server recognizes the authentication information in request 217 and returns application content to the web browser, starting with response 219.

Figure 9:
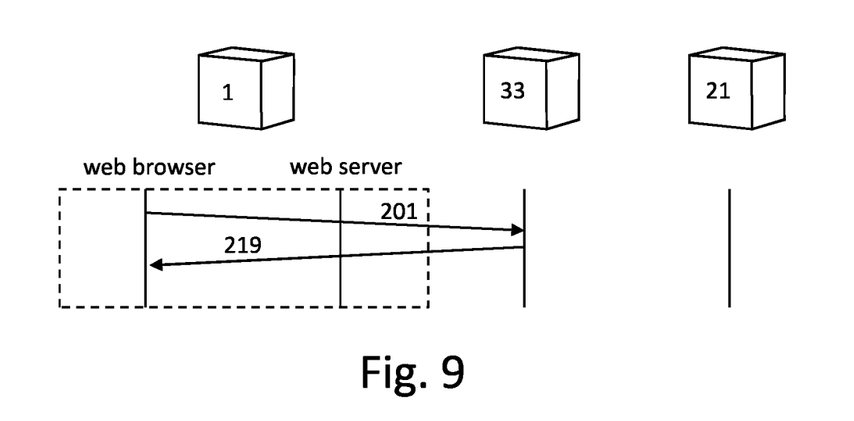
FIG. 9 shows an example of a flow in which a user is using a web application which he previously used in the same user session with the same web browser.

FIG. 9 shows an example of a flow in which a user is using a web application which he previously used in the same user session with the same web browser. With request 201, a user uses a web browser on a computing device 1 to navigate to a web application on an application server 33. In the example of FIG. 9, the web application recognizes the session and returns application content to the web browser, starting with response 219.

Figure 10:
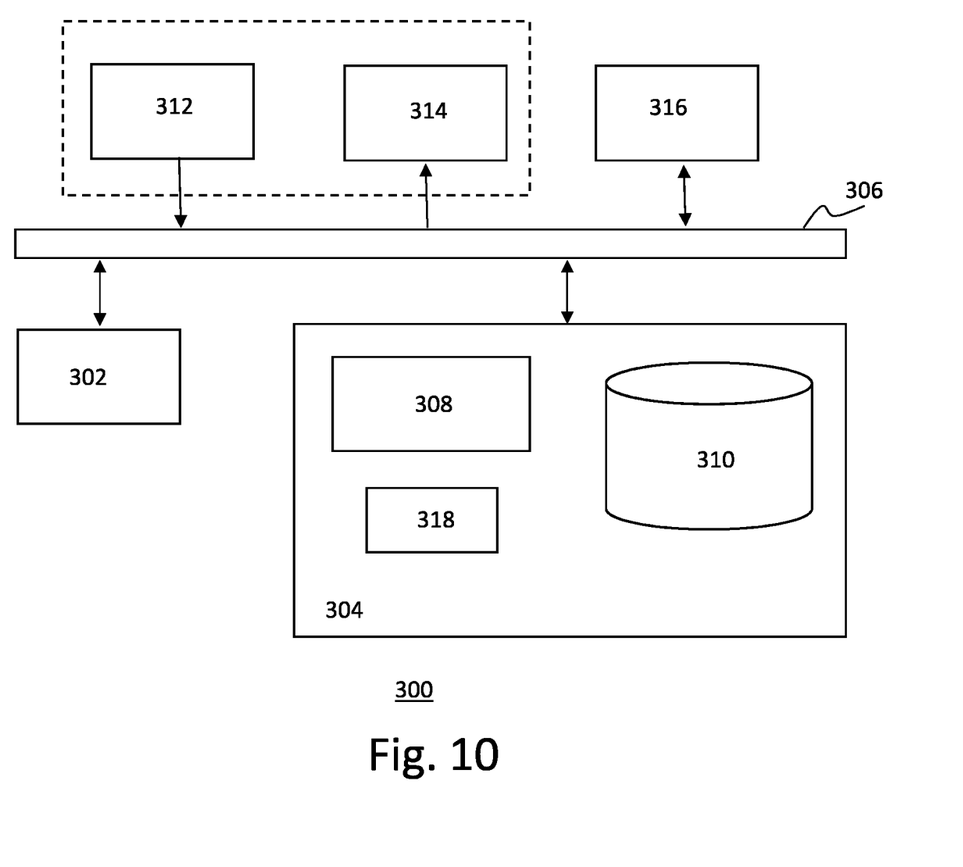
FIG. 10 is a block diagram of an exemplary data processing system for performing the method of the invention.

FIG. 10 depicts a block diagram illustrating an exemplary data processing system that may perform the method as described with reference to FIGS. 2-9.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, he one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A computing device comprising at least one hardware processor, the at least one hardware processor being configured to:
    transmit a first request from a web browser running on the computing device to an application server,
    receive, at the web browser, from the application server, a first response which directs the web browser to an authentication server,
    transmit a second request from the web browser to the authentication server upon receiving the first response,
    receive, at the web browser, from the authentication server, a second response which causes the web browser to contact a local device agent also running on the computing device, the local device agent comprising a local web server,
    provide a third request from the web browser to the local web server upon receiving the second response,
    determine, at the local device agent, based on an identifier of a user and/or an identifier of a user session associated with the third request, whether a token for authenticating the user is available,
    provide a third response from the local web server to the web browser if the token is available, the third response comprising the token,
    transmit a fourth request from the web browser to the authentication server upon obtaining the third response, the fourth request comprising the token,
    receive, at the web browser, a fourth response from the authentication server, the fourth response comprising authentication information associated with the token and causing the web browser to direct to the application server, and
    transmit a fifth request from the web browser to the application server upon receiving the fourth response, the fifth request comprising the authentication information.

2. The computing device as claimed in claim 1, wherein the at least one hardware processor is configured to obtain a process identifier from an operating system of the computing device based on an identifier associated with the third request and obtain the identifier of the user session and/or the identifier of the user from the operating system based on the process identifier.

3. The computing device as claimed in claim 1, wherein the local web server is configured not to receive and/or process any messages directly from the authentication server.

4. The computing device as claimed in claim 3, wherein the local web server is configured not to receive and/or process any messages from outside the computing device.

5. The computing device as claimed in claim 1, wherein the computing device is a user device or a workspace server, the workspace server running the web browser and the local device agent in a workspace associated with the user.

6. The computing device as claimed in claim 1, wherein the at least one hardwire processor is configured to determine, at the local device agent, an identifier associated with the authentication server based on the third request and determine, at the local device agent, based on the identifier of the user and/or the identifier of the user session and based on the identifier associated with the authentication server, whether the token for authenticating the user at the authentication server is available.

7. The computing device as claimed in claim 1, wherein the token is associated with the identifier of the user session and the at least one hardware processor is configured to delete the token when the user logs out of the computing device.

8. The computing device as claimed in claim 1, wherein the token is associated with the identifier of the user and the at least one hardware processor is configured to share the token such that the token can be used on a further computing device when the user is logged in to the further computing device.

9. The computing device as claimed in claim 8, wherein the at least one hardware processor is configured to determine whether another user session associated with the user exists when the user logs out of the computing device and delete the token if another user session associated with the user is determined not to exist.

10. The computing device as claimed in claim 1, wherein the at least one hardware processor is configured to provide the token from the local web server to a further web browser also running on the computing device.

11. An authentication server comprising at least one hardware processor, the at least one hardware processor being configured to:
    receive a request from a web browser running on a computing device, the request being received because the web browser has been directed to the authentication server by an application server,
    determine whether a user can be authenticated based on the request,
    transmit a response to the web browser if the user could not be authenticated based on the request, the response causing the web browser to contact a local device agent also running on the computing device, the local device agent comprising a local web server,
    receive another request from the web browser, the another request comprising a token for authenticating the user which was obtained by the web browser from the local web server,
    determine whether the user can be authenticated based on the token, and
    transmit another response to the web browser to direct the web browser to the application server if the user could be authenticated based on the token, the another response comprising authentication information associated with the token.

12. The authentication server as claimed in claim 11, wherein the response comprises an IP address having a value of 127.0.0.1 to cause the web browser to contact the local device agent at the IP address.

13. The authentication server as claimed in claim 11, wherein the at least one hardware processor is configured to determine whether the user can be authenticated based on the request by comparing a session identifier included in the request with a plurality of stored session identifiers.

14. The authentication server as claimed in claim 11, wherein the at least one hardware processor is configured to:
    receive an alternative request from the web browser, the alternative request not comprising any token for authenticating the user,
    request and receive user input for authenticating the user upon receiving the alternative request, determine whether the user can be authenticated based on the user input, create or retrieve the token based on the user input if the user could be authenticated based on the user input, and transmit an alternative response to the web browser to direct the web browser to the local web server if the user could be authenticated based on the user input, the alternative response comprising the authentication information and the token.

15. A computer-implemented method of enabling authentication of a user, the method comprising:

transmitting a first request from a web browser running on a computing device to an application server;

receiving, at the web browser, from the application server, a first response which directs the web browser to an authentication server;

transmitting a second request from the web browser to the authentication server upon receiving the first response;

receiving, at the web browser, from the authentication server, a second response which causes the web browser to contact a local device agent also running on the computing device, the local device agent comprising a local web server;

providing a third request from the web browser to the local web server upon receiving the second response;

determining, at the local device agent, based on an identifier of the user and/or an identifier of a user session associated with the third request, whether a token for authenticating the user is available;

providing a third response from the local web server to the web browser if the token is available, the third response comprising the token;

transmitting a fourth request from the web browser to the authentication server upon obtaining the third response, the fourth request comprising the token;

receiving, at the web browser, a fourth response from the authentication server, the fourth response comprising authentication information associated with the token and causing the web browser to direct to the application server; and transmitting a fifth request from the web browser to the application server upon receiving the fourth response, the fifth request comprising the authentication information.

16. The method as claimed in claim 15, further comprising obtaining a process identifier from an operating system of the computing device based on an identifier associated with the third request and obtaining the identifier of the user session and/or the identifier of the user from the operating system based on the process identifier.

17. The method as claimed in claim 15, comprising determining an identifier associated with the authentication server based on the third request and determining, based on the identifier of the user and/or the identifier of the user session and based on the identifier associated with the authentication server, whether the token for authenticating the user at the authentication server is available.

18. The method as claimed in claim 15, wherein the token is associated with the identifier of the user session and further comprising deleting the token when the user logs out of the computing device.

19. The method as claimed in claim 15, wherein the token is associated with the identifier of the user and further comprising sharing the token such that the token can be used on a further computing device when the user is logged in to the further computing device.

20. The method as claimed in claim 15, further comprising determining whether another user session associated with the user exists when the user logs out of the computing device and deleting the token if another user session associated with the user is determined not to exist.

21. The method as claimed in claim 15, further comprising providing the token from the local web server to a further web browser also running on the computing device.

22. A computer-implemented method of authenticating a user, the method comprising:

receiving, at an authentication server, a request from a web browser running on a computing device, the request being received because the web browser has been directed to the authentication server by an application server;

determining whether the user can be authenticated based on the request;

transmitting a response to the web browser if the user could not be authenticated based on the request, the response causing the web browser to contact a local device agent also running on the computing device, the local device agent comprising a local web server;

receiving another request from the web browser, the another request comprising a token for authenticating the user which was obtained by the web browser from the local web server;

determining whether the user can be authenticated based on the token; and transmitting another response to the web browser to direct the web browser to the application server if the user could be authenticated based on the token, the another response comprising authentication information associated with the token.

23. The method as claimed in claim 22, wherein the response comprises an IP address having a value of 127.0.0.1 to cause the web browser to contact the local device agent at the IP address.

24. The method as claimed in claim 22, wherein determining whether the user can be authenticated based on the request comprises comparing a session identifier included in the request with a plurality of stored session identifiers.

* * * * *